(12) United States Patent
Casey et al.

(10) Patent No.: US 9,500,507 B2
(45) Date of Patent: Nov. 22, 2016

(54) METHOD OF FORMING A CORROSION-RESISTANT VIBRATORY FLOWMETER

(71) Applicant: Micro Motion, Inc., Boulder, CO (US)

(72) Inventors: Megan Casey, Boulder, CO (US); Anthony William Pankratz, Arvada, CO (US)

(73) Assignee: Micro Motion, Inc., Boulder, CO (US)

( * ) Notice: Subject to any disclaimer, the term of this patent is extended or adjusted under 35 U.S.C. 154(b) by 185 days.

(21) Appl. No.: 14/155,621

(22) Filed: Jan. 15, 2014

(65) Prior Publication Data

US 2014/0123466 A1    May 8, 2014

Related U.S. Application Data

(62) Division of application No. 13/391,856, filed as application No. PCT/US2009/056813 on Sep. 14, 2009, now Pat. No. 8,701,502.

(51) Int. Cl.

| | |
|---|---|
| *C23C 10/06* | (2006.01) |
| *G01F 1/84* | (2006.01) |
| *C23C 10/18* | (2006.01) |
| *C23C 12/02* | (2006.01) |
| *G01F 15/00* | (2006.01) |

(52) U.S. Cl.
CPC ............. *G01F 1/8404* (2013.01); *C23C 10/06* (2013.01); *C23C 10/18* (2013.01); *C23C 12/02* (2013.01); *G01F 1/8409* (2013.01); *G01F 1/8468* (2013.01); *G01F 15/006* (2013.01); *Y10T 29/49885* (2015.01); *Y10T 29/49888* (2015.01); *Y10T 428/1393* (2015.01)

(58) Field of Classification Search
CPC ............ C23C 8/06–8/38; C23C 10/00–10/60; G01F 1/76; G01F 1/84
See application file for complete search history.

(56) References Cited

U.S. PATENT DOCUMENTS

| | | |
|---|---|---|
| 5,157,975 A | 10/1992 | Tanaka et al. |
| 6,170,339 B1 | 1/2001 | Van Der Pol et al. |
| 6,293,158 B1 * | 9/2001 | Ollila ................... G01F 1/8404 73/861.355 |

(Continued)

FOREIGN PATENT DOCUMENTS

| | | |
|---|---|---|
| CA | 2565276 A1 | 7/2006 |
| GB | 2439313 A | 12/2007 |

(Continued)

*Primary Examiner* — Elizabeth Burkhart
(74) *Attorney, Agent, or Firm* — The Ollila Law Group LLC

(57) ABSTRACT

A method of forming a corrosion-resistant vibratory flowmeter is provided. The method comprises constructing a flowmeter assembly including one or more flow tubes configured to be vibrated, with the method being characterized by coating at least a portion of the flowmeter assembly with a diffusion coating, with the diffusion coating being diffused into and comprising a part of the flowmeter assembly.

18 Claims, 4 Drawing Sheets

(56) References Cited

U.S. PATENT DOCUMENTS

| | | | |
|---|---|---|---|
| 6,513,392 B1 * | 2/2003 | Barger | G01F 1/8404 73/861.356 |
| 6,698,644 B2 | 3/2004 | Lorenz | |
| 6,748,813 B1 | 6/2004 | Barger et al. | |
| 7,451,662 B2 | 11/2008 | Drahm et al. | |
| 7,645,485 B2 | 1/2010 | Madhava | |
| 2004/0197471 A1 | 10/2004 | Knowles et al. | |
| 2006/0042402 A1 | 3/2006 | Bell et al. | |
| 2006/0110560 A1 | 5/2006 | Hussain et al. | |
| 2008/0053243 A1 * | 3/2008 | Kimball | G01F 1/44 73/861.63 |
| 2009/0297704 A1 * | 12/2009 | Madhava | C22C 27/06 427/192 |

FOREIGN PATENT DOCUMENTS

| | | |
|---|---|---|
| JP | 10221148 | 8/1998 |
| JP | 2002062175 | 2/2002 |
| JP | 2008268227 | 6/2008 |
| RU | 2184903 C1 | 7/2002 |
| RU | 2007135322 A | 3/2009 |
| WO | 0102812 A1 | 1/2001 |
| WO | 2006089855 A1 | 8/2006 |

* cited by examiner

METHOD OF FORMING A CORROSION-RESISTANT VIBRATORY FLOWMETER

This is a Divisional Application of and claims the benefit of U.S. patent application Ser. No. 13/391,856, filed on Feb. 23, 2012, entitled "Corrosion-Resistant Coating For a Vibratory Flowmeter and Method for Forming the Coating," which is a National Stage Entry of PCT application PCT/US09/56813, entitled "Corrosion-Resistant Vibratory Flowmeter and Method," filed on Sep. 14, 2009, which are hereby incorporated by reference in their entirety.

BACKGROUND OF THE INVENTION

1. Field of the Invention

The present invention relates to a vibratory flowmeter method, and more particularly, to a method for forming a corrosion-resistant vibratory flowmeter.

2. Statement of the Problem

Vibrating conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flowmeter includes one or more conduits that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation. The instrumentation receives signals from the two pickoff sensors and processes the signals in order to derive a mass flow rate measurement, among other things.

Vibratory flowmeters, including Coriolis mass flowmeters and densitometers, therefore employ one or more flow tubes that are vibrated in order to measure a fluid. Such flow tubes are commonly formed of metal in order to possess good vibrational characteristics and high strength, such as for high-pressure flow fluid applications.

However, vibratory flowmeters are often used for handling corrosive and/or chemically reactive materials. Metal flow tubes can be damaged by corrosive or reactive flow fluids. In addition, metal flow tubes may leach material from the flow fluid and/or the flow fluid may leach material from the flow tubes. Further, the coating or coatings may prevent erosion by providing a very hard surface. Moreover, the coatings may be slippery or present low coefficients of friction to a flow.

FIG. 1 is a cross-section of a prior art flow tube that includes an additional lining formed inside the interior of the tube. Such a prior art lining typically comprises TEFLON, TEFZEL, or other plastics, for example, and provides a corrosion-resistant and chemically inert lining. As a result, the flow fluid does not contact the metal flow tube.

However, the prior art has drawbacks. The prior art lining comprises a separate component that must be deposited, bonded, or adhered to the inner surface of the prior art flow tube. Unfortunately, the prior art lining may delaminate from the interior of the flow tube. The delamination may result in leakage behind the prior art lining, corrosion, and flow obstruction. In extreme cases, the delamination may result in breakage of the lining and broken pieces of the lining may join the flow fluid and affect downstream filters, valves, pumps, or other mechanisms. Further, free pieces of the lining may affect downstream mixtures, chemical processes, equipment, or measurements.

The prior art lining typically is much softer than the metal of the prior art flow tube. Therefore, the prior art lining must be significantly thick in order to provide an adequate barrier and prevent flow fluid contact with the underlying flow tube. Also, the prior art lining must be significantly thick in order to not collapse or be adversely structurally affected by vibration. Unfortunately, the thickness of the prior art lining will affect the vibrational characteristics of a prior art flowmeter assembly. More drive power may be required. Sensitivity may be decreased. The resonant frequency of the flowmeter will be changed.

ASPECTS OF THE INVENTION

In one aspect of the invention, a method of forming a corrosion-resistant vibratory flowmeter comprises:

constructing a flowmeter assembly including one or more flow tubes configured to be vibrated;

coating at least a portion of the flowmeter assembly with a diffusion coating, with the diffusion coating being diffused into and comprising a part of the flowmeter assembly.

Preferably, the diffusion coating is diffused into the at least a portion of the flowmeter assembly above a predetermined high temperature.

Preferably, the diffusion coating is diffused into the at least a portion of the flowmeter assembly prior to attaching temperature-sensitive elements to the flowmeter assembly.

Preferably, the diffusion coating is applied by a deposition process.

Preferably, the diffusion coating is applied by a vapor deposition process.

Preferably, the diffusion coating is applied by a chemical vapor deposition process.

Preferably, the diffusion coating is applied to inner surfaces of the flowmeter assembly.

Preferably, the diffusion coating is applied to outer surfaces of the flowmeter assembly.

Preferably, the flowmeter assembly includes at least two process connections and wherein the diffusion coating covers the at least two process connections.

Preferably, the diffusion coating is applied to substantially all surfaces of the flowmeter assembly.

In one aspect of the invention, a method of forming a corrosion-resistant vibratory flowmeter comprises:

constructing a flowmeter assembly including one or more flow tubes configured to be vibrated;

attaching at least two process connections to the flowmeter assembly; and coating at least a portion of the flowmeter assembly and the at least two process connections with a diffusion coating, with the diffusion coating being diffused into and comprising a part of the flowmeter assembly.

Preferably, the diffusion coating is diffused into the at least a portion of the flowmeter assembly above a predetermined high temperature.

Preferably, the diffusion coating is diffused into the at least a portion of the flowmeter assembly prior to attaching temperature-sensitive elements to the flowmeter assembly.

Preferably, the diffusion coating is applied by a deposition process.

Preferably, the diffusion coating is applied by a vapor deposition process.

Preferably, the diffusion coating is applied by a chemical vapor deposition process.

Preferably, the diffusion coating is applied to inner surfaces of the flowmeter assembly.

Preferably, the diffusion coating is applied to outer surfaces of the flowmeter assembly.

Preferably, the diffusion coating is applied to substantially all surfaces of the flowmeter assembly.

DETAILED DESCRIPTION OF THE INVENTION

Figure 1:
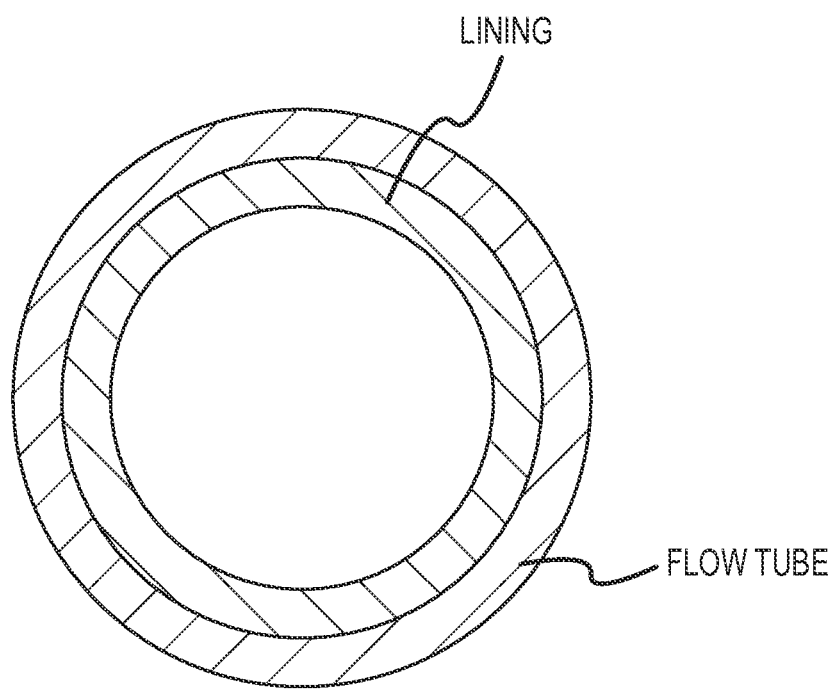
FIG. 1 is a cross-section of a prior art flow tube that includes an additional lining formed inside the interior of the tube.
Figure 2:
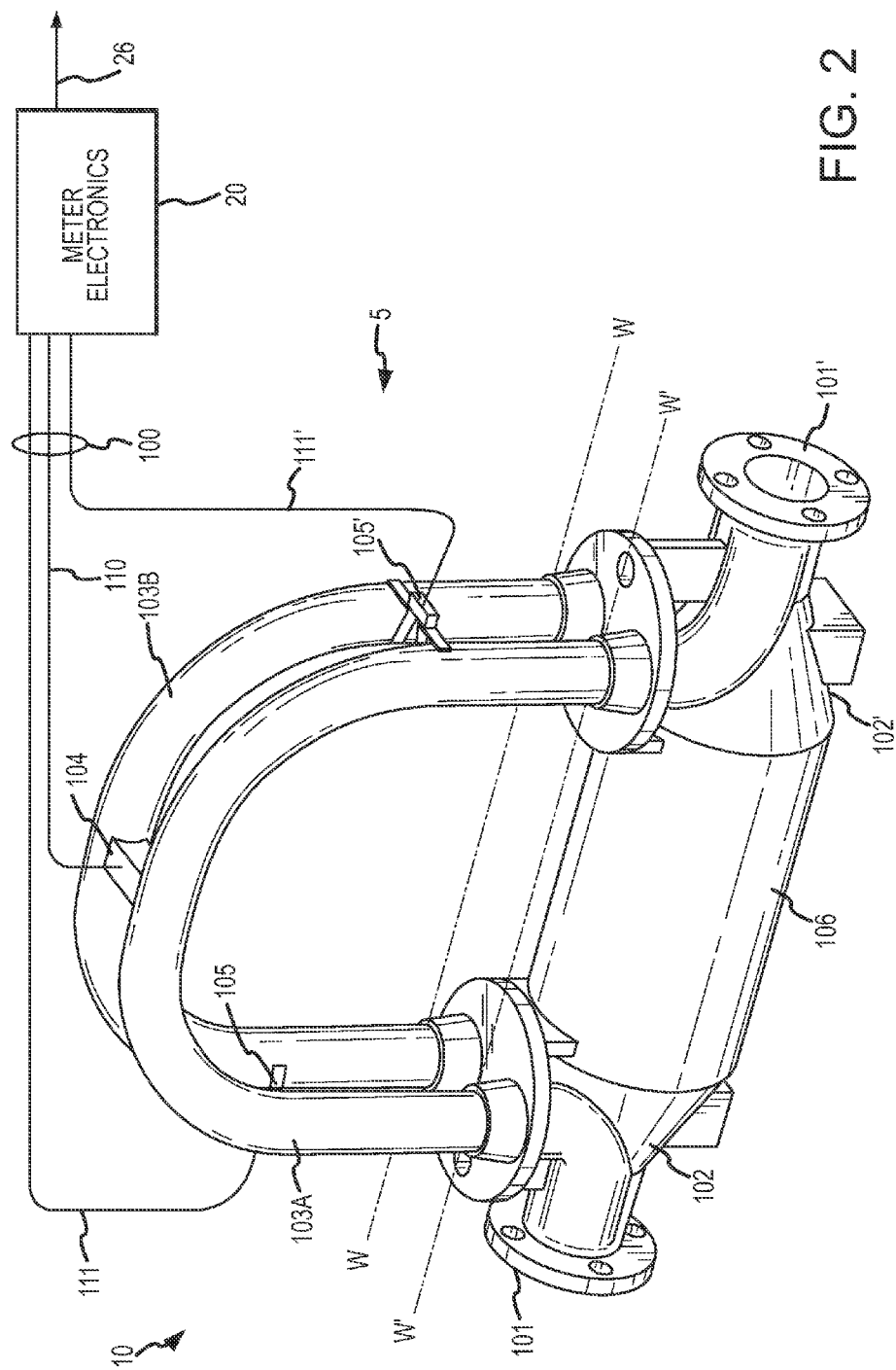
FIG. 2 shows a vibratory flowmeter according to the invention.
Figure 3:
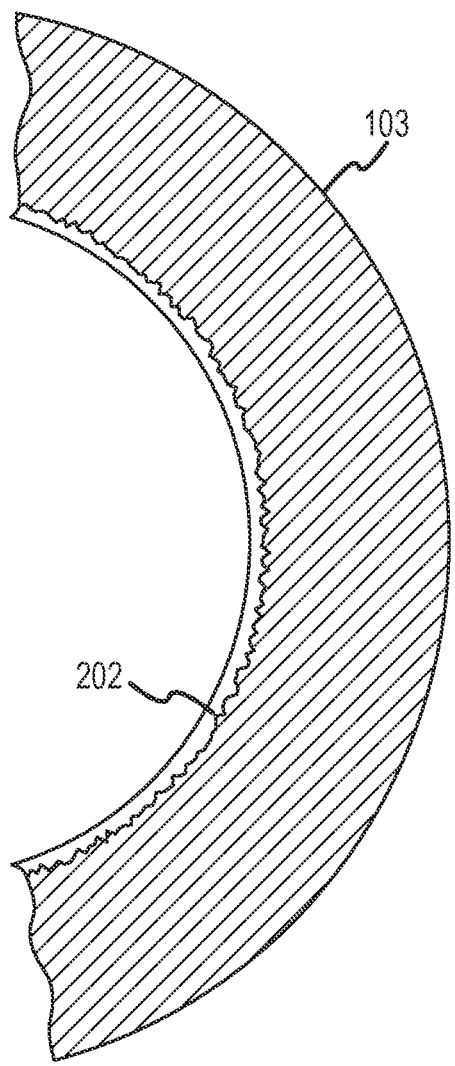
FIG. 3 shows a cross-section of a flow tube including a diffusion coating according to the invention.
Figure 4:
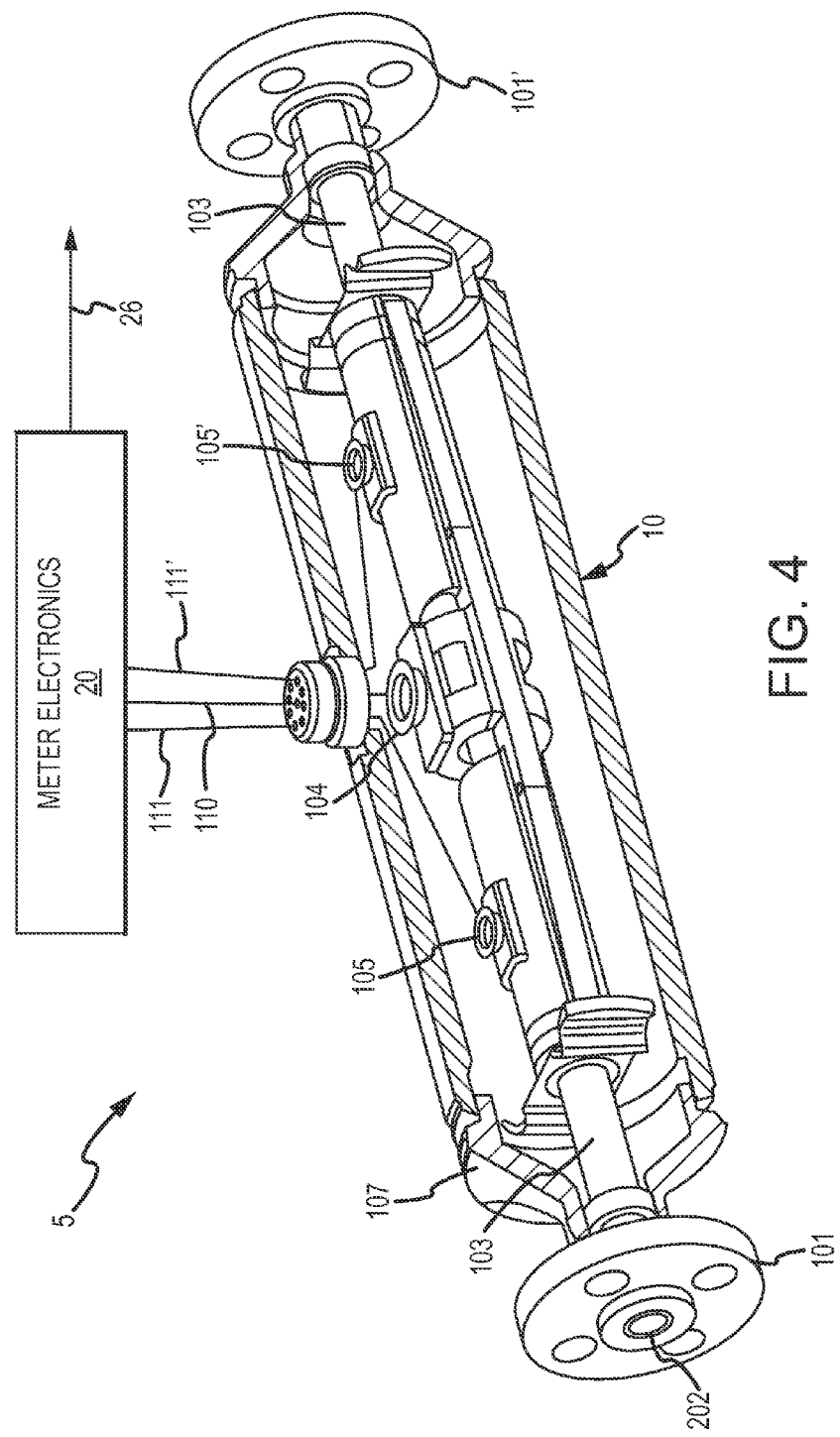
FIG. 4 shows a single straight tube vibratory flowmeter including the diffusion coating according to the invention.

FIGS. 2-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2 shows a vibratory flowmeter 5 according to the invention. The vibratory flowmeter 5 comprises a flowmeter assembly 10 and meter electronics 20. The meter electronics 20 is connected to the meter assembly 10 via leads 100 and is configured to provide measurements of one or more of a density, mass flow rate, volume flow rate, totalized mass flow, temperature, or other measurements or information over a communication path 26. It should be apparent to those skilled in the art that the vibratory flowmeter can comprise any manner of vibratory flowmeter, regardless of the number of drivers, pick-off sensors, flow conduits, or the operating mode of vibration. In addition, it should be recognized that the vibratory flowmeter 5 can alternatively comprise a vibratory densitometer.

The flowmeter assembly 10 includes a pair of flanges 101 and 101', manifolds 102 and 102', a driver 104, pick-off sensors 105 and 105', and flow conduits 103A and 103B. The driver 104 and the pick-off sensors 105 and 105' are connected to the flow conduits 103A and 103B.

The flanges 101 and 101' comprise process connections that are affixed to the manifolds 102 and 102'. The manifolds 102 and 102' can be affixed to opposite ends of a spacer 106 in some embodiments. The spacer 106 maintains the spacing between the manifolds 102 and 102' in order to prevent pipeline forces from being transmitted to flow conduits 103A and 103B. When the flowmeter assembly 10 is inserted into a pipeline (not shown) which carries the flow fluid being measured, the flow fluid enters the flowmeter assembly 10 through the flange 101, passes through the inlet manifold 102 where the total amount of flow fluid is directed to enter the flow conduits 103A and 103B, flows through the flow conduits 103A and 103B and back into the outlet manifold 102', where it exits the meter assembly 10 through the flange 101'.

The flow fluid can comprise a liquid. The flow fluid can comprise a gas. The flow fluid can comprise a multi-phase fluid, such as a liquid including entrained gases and/or entrained solids.

The flow conduits 103A and 103B are selected and appropriately mounted to the inlet manifold 102 and to the outlet manifold 102' so as to have substantially the same mass distribution, moments of inertia, and elastic modules about the bending axes W-W and W'-W' respectively. The flow conduits 103A and 103B extend outwardly from the manifolds 102 and 102' in an essentially parallel fashion.

The flow conduits 103A and 103B can be formed of a variety of materials. In some embodiments, the flow conduits 103A and 103B are formed of metal or steel. In other embodiments, the flow conduits 103A and 103B are formed of corrosion-resistant materials, including materials such as stainless steel, tantalum, HASTELLOY, or titanium, for example. However, tantalum, HASTELLOY, and titanium are very expensive materials, despite their excellent corrosion-resistant properties, and greatly increase flowmeter cost. Other materials are contemplated and are within the scope of the description and claims, including non-metallic materials.

In addition, the meter assembly 10 can be formed of a mix of metals. For example, the manifolds 102 and 102' can be made of a corrosion-resistant metal such as HASTELLOY, while the flow conduit or conduits can be made of a less costly and easier to work metal or material and can then be coated, as described herein. Other combinations of the coating and corrosion-resistant metals or materials are contemplated and are within the scope of the description and claims.

The flow conduits 103A and 103B are driven by the driver 104 in opposite directions about the respective bending axes W and W' and at what is termed the first out of phase bending mode of the vibratory flowmeter 5. The driver 104 may comprise one of many well known arrangements, such as a magnet mounted to the flow conduit 103A and an opposing coil mounted to flow conduit 103B. An alternating current is passed through the opposing coil to cause both conduits to oscillate. A suitable drive signal is applied by the meter electronics 20 to the driver 104 via the lead 110. Other driver devices are contemplated and are within the scope of the description and claims.

The meter electronics 20 receives sensor signals on the leads 111 and 111', respectively. The meter electronics 20 produces a drive signal on the lead 110, which causes the driver 104 to oscillate the flow conduits 103A and 103B. Other sensor devices are contemplated and are within the scope of the description and claims.

The meter electronics 20 processes the left and right velocity signals from the pick-off sensors 105 and 105' in order to compute a flow rate, among other things. The communication path 26 provides an input and an output means that allows the meter electronics 20 to interface with an operator or with other electronic systems. The description of FIG. 2 is provided merely as an example of the operation of a Coriolis flowmeter and is not intended to limit the teaching of the present invention.

The meter electronics 20 in one embodiment is configured to vibrate the flowtubes 103A and 103B. The vibration is performed by the driver 104. The meter electronics 20 further receives resulting vibrational signals from the pickoff sensors 105 and 105'. The vibrational signals comprise a vibrational response of the flowtubes 103A and 103B. The meter electronics 20 processes the vibrational response and determines a response frequency and/or phase difference. The meter electronics 20 processes the vibrational response and determines one or more flow measurements, including a mass flow rate and/or density of the flow fluid. Other vibrational response characteristics and/or flow measurements are contemplated and are within the scope of the description and claims.

In one embodiment, the flowtubes 103A and 103B comprise substantially U-shaped flowtubes, as shown. Alternatively, in other embodiments, the flowtubes can comprise substantially straight flowtubes (see FIG. 4 and the accompanying discussion below). Additional flowmeter shapes and/or configurations can be used and are within the scope of the description and claims.

FIG. 3 shows a cross-section of a flow tube 103 including a diffusion coating 202 according to the invention. The figure shows the flow tube 103 and additionally shows the diffusion coating 202 diffused into the material of the flow tube 103. Consequently, the coating material becomes part of, i.e., integral to, the flow tube 103. The diffusion coating 202 is not merely a separate layer added to the flow tube 103 and bonded or affixed thereto. The material of the diffusion coating 202 is mixed with and becomes part of the structure due to the high temperature used in the diffusion process.

The diffusion coating 202 is diffused into at least a portion of the flowmeter assembly 10, including the interior surface. In addition, the diffusion coating 202 may additionally be applied to the flanges 101 and 101', the manifolds 102 and 102', a spacer 106 if included in the flowmeter assembly 10, brace bars, balance weights/balance structures, and/or mounts for other components. This listing of potentially coated components is not exhaustive and other portions of the flowmeter assembly 10 may also be coated as described herein. The diffusion coating 202 in some embodiments is applied to a complete flow path of the vibratory flowmeter 5.

Importantly, the diffusion coating 202 is diffused into at least a portion of the flowmeter assembly 10 prior to attaching temperature-sensitive elements to the flowmeter assembly 10. This can include any manner of temperature-sensitive elements that may be affected by the temperature of a diffusion process. For example, flow tube pick-off sensors, temperature sensors, drivers, and wiring typically include non-metallic components that may be damaged by heat. Other components can also be affected, such as adhesives, plastics, electrical insulation and circuitry materials and other relatively low-temperature materials.

Consequently, the diffusion coating 202 in some embodiments is applied after most or all of the welding operations. As a result, the welding operations cannot damage or affect the diffusion coating 202. Welding of already-coated components is not required, and consequently there is no possibility of a welding operation burning through or weakening the coating. Further, the diffusion coating 202 may at least partially fill in any imperfections in a weld, such as low spots or small gaps, for example.

The desired surface composition can be achieved for various purposes, such as to prevent corrosion of a flow tube 103. Alternatively, or in addition, the desired surface composition can prevent chemical reaction with a flow fluid and/or prevent leaching or transfer of material between the flow tube 103 and the flow fluid. Further, the coating or coatings may prevent erosion by providing a very hard surface. Moreover, the coatings may be slippery or present low coefficients of friction to a flow.

The diffusion coating 202 can be applied by a deposition process. The diffusion coating 202 can be applied by a vapor deposition process. The diffusion coating 202 can be applied by a chemical vapor deposition process.

There are many forms of deposition or diffusion that can be employed and many different variations to depositing a vapor/plating material onto a surface. Some types of vapor deposition are: aerosol assisted chemical vapor deposition (CVD), plasma CVD, microwave CVD, direct liquid injection CVD, atomic layer CVD, hot wire CVD, rapid thermal CVD, and vapor phase epitaxy. It should be understood that this listing is not exhaustive and other processes may exist or be developed. All of these processes and variations of the processes can be used to apply the coating to the surface and do not limit the scope of this patent.

The diffusion coating 202 is applied through a high temperature process, wherein the flowmeter assembly 10 (or a portion thereof) is placed in a diffusion chamber along with a diffusion carrier. The flowmeter assembly 10 is heated in the presence of the diffusion carrier, wherein the diffusion constituent in the diffusion carrier is diffused onto and into the surface or surfaces of the flowmeter assembly 10. The temperature may depend on the material of the flowmeter assembly 10, the diffusion constituent that becomes the diffusion coating 202, and other possible factors including a carrier material, a desired diffusion speed, external heating, etc.

The diffused-in metal becomes a part of the flowmeter assembly 10 and is not merely bonded or adhered to the flowmeter assembly 10. This is achieved through the use of a high temperature diffusion environment, wherein the diffusion coating is diffused into the flowmeter assembly 10 above a predetermined high temperature. In some embodiments, the predetermined high temperature is three hundred degrees Fahrenheit or greater, or any temperature required to diffuse a non-plastic coating material into a metallic (or harder) flowmeter material. Diffusion may require that molecules of the coating material penetrate at least partially into the flowmeter material and intermingle, bonding and/or interlocking with the molecules of the flowmeter material.

For this reason, the diffusion coating 202 cannot be used for flow tubes formed of plastic. Even a high temperature plastic or a thermoplastic.

The resulting diffusion coating 202 becomes integral to the flow tube material. Further, the diffusion coating 202 does not form and is not restricted to a uniform and distinguishable layer, as shown in the figure. This is in contrast to the prior art.

The diffusion carrier can comprise a gas that carries predetermined diffusion particles (i.e., the diffusion constituent) to be deposited on the flowmeter assembly 10. The predetermined diffusion particles can comprise a corrosion-resistant material or mixture. The diffusion carrier can be introduced at an ambient pressure or at a pressure higher or lower than the ambient pressure. Alternatively, the diffusion carrier can comprise a liquid, slurry, paste, et cetera, that includes the predetermined diffusion particles or chemicals.

At least a portion of the flowmeter assembly 10 is brought into contact with the diffusion carrier, wherein the predetermined diffusion particles are diffused into some or all surfaces of the flowmeter assembly 10.

The diffusion carrier can further include any manner of chemical reactants, catalysts, or promoters that aid in the diffusion process. The diffusion carrier is heat-activated and the predetermined diffusion particles are deposited on, and diffused into, surfaces of the flowmeter assembly 10. Along with the heat activating the diffusion carrier, in some CVD processes a plasma also activates the diffusion carrier and promotes a quality coating.

The diffusion coating 202 can be of any suitable thickness. Because the material of the coating is diffused into the metal of the flow tube 103, the diffusion coating 202 can be very thin. One limit on the thinness of the diffusion coating 202 may be the porosity of the underlying flow tube material. Porous flow tube materials may require a thicker diffusion coating 202. Another limit may be a smoothness of the flow tube surface. A rough surface may require a thicker diffusion coating 202 in order to completely cover the underlying flow tube material and prevent any pinhole imperfections in the coating. Further, a need for a thicker diffusion coating 202 on one region of a flowmeter assembly 10 may require a thicker diffusion over the entire flowmeter assembly 10. It should be understood that the thickness of the diffusion coating 202 may be difficult to measure, as the diffusion coating 202 may not comprise a completely smooth surface and may not comprise a regular or uniform layer.

The diffusion coating 202 can comprise a metal or metal mixture. Alternatively, the diffusion coating 202 can comprise a non-metallic material that is capable of being diffused into a flow tube 103.

The diffusion coating 202 preferably comprises a material that is highly corrosion resistant. The diffusion coating 202 comprises a material that is highly chemically stable and non-reactive. The diffusion coating 202 comprises a material that does not leach material from the flow fluid. The diffusion coating 202 comprises a material such that the flow fluid cannot leach material from the diffusion coating 202.

In some embodiments, the diffusion coating 202 comprises silicon or a mainly silicon material. In this embodiment, the diffusion coating 202 may commonly be about twenty-five microns in thickness. Alternatively, the diffusion coating 202 can comprise carbon or a mainly carbon material, such as supplied by a $C_2H_2$ diffusion carrier, for example. In this embodiment, the diffusion coating 202 may commonly be about eighty microns in thickness. It should be understood that other diffusion materials/diffusion carriers are contemplated and are within the scope of the description and claims.

The diffusion coating 202 in some embodiments is applied to inner surfaces of the flow tube 103 or the flowmeter assembly 10. The diffusion coating 202 in some embodiments is applied to outer surfaces of the flow tube 103 or the flowmeter assembly 10. The diffusion coating 202 in some embodiments is applied to all surfaces of the flow tube 103 or the flowmeter assembly 10. This can further include inlet and outlet structures and flow splitters, for example. In addition, the diffusion coating 202 can be applied to other surfaces of the flowmeter assembly 10, including the flanges/process connections 101 and 101', as the process connections 101 and 101' may need to be corrosion resistant. Other components that can be coated according to the invention include spacers, manifolds, links or brace bars, balance structures, and mounting structures. The above examples are not exhaustive and other coated surfaces or components are contemplated and are within the scope of the description and claims.

The flow tube 103, and/or the flowmeter assembly 10, can be formed of a predetermined material. The flow tube 103 and/or the flowmeter assembly 10 can be formed of a material that can be subjected to a high temperature diffusion process. In some embodiments, the flow tube 103, and/or the flowmeter assembly 10, can be formed of a predetermined metal or metallic material, for example. In some embodiments, a flow tube 103 can be formed of stainless steel, for example, which has both good vibrational characteristics and good corrosion resistance properties. Alternatively, components of the flowmeter assembly 10 can be formed of other materials. The flowmeter assembly 10 can be partially or fully non-metallic, such as being formed of glass, ceramic, quartz, or other materials that can withstand the temperatures of a diffusion process.

FIG. 4 shows a single straight tube vibratory flowmeter 5 including the diffusion coating 202 according to the invention. The diffusion coating 202 is formed only on an inner surface of the flowtube 103 in the embodiment shown. However, it should be understood that various regions of the vibratory flowmeter 5 can include the diffusion coating 202, as previously discussed. The straight tube vibratory flowmeter 5 includes the diffusion coating 202. The diffusion coating 202 is applied as in the previous figures and discussion and provides the advantages of a relatively thin layer of a corrosion coating without the need for thick, expensive, and vibrationally modifying flow tube or flowmeter assembly construction The vibratory flowmeter and method according to the invention can be employed according to any of the embodiments in order to provide several advantages, if desired. The diffusion coating provides a barrier between the flowmeter assembly and the flow fluid. The diffusion coating provides an integral coating that is part of the structure and is not merely bonded thereto. Consequently, the diffusion coating will not separate, delaminate, or fragment. The diffusion coating is thinner and adds insignificant mass and therefore has negligible effect on vibrational characteristics. The diffusion coating enables the flowmeter assembly to retain the vibrational qualities of the flow tube material. The diffusion coating requires less of an expensive material in order to provide a barrier.

What is claimed is:

1. A method of forming a corrosion-resistant vibratory flowmeter, the method comprising constructing a flowmeter assembly including one or more flow tubes configured to be vibrated, with the method being characterized by:
    coating at least a portion of the flowmeter assembly with a diffusion coating, with the diffusion coating being diffused into and comprising a part of the flowmeter assembly, wherein the diffusion coating is applied after a welding operation of the flowmeter.

2. The method of claim 1, with the diffusion coating being diffused into the at least a portion of the flowmeter assembly above a predetermined high temperature.

3. The method of claim 1, with the diffusion coating being diffused into the at least a portion of the flowmeter assembly prior to attaching temperature-sensitive elements to the flowmeter assembly.

4. The method of claim 1, with the diffusion coating being applied by a deposition process.

5. The method of claim 1, with the diffusion coating being applied by a vapor deposition process.

6. The method of claim 1, with the diffusion coating being applied by a chemical vapor deposition process.

7. The method of claim 1, with the diffusion coating being applied to outer surfaces of the flowmeter assembly.

8. The method of claim 1, with the flowmeter assembly including at least two process connections and wherein the diffusion coating covers the at least two process connections.

9. The method of claim 1, with the diffusion coating being applied to substantially fill in imperfections in the welding operation.

10. A method of forming a corrosion-resistant vibratory flowmeter, the method comprising constructing a flowmeter assembly including one or more flow tubes configured to be vibrated, with the method being characterized by:
    attaching at least two process connections to the flowmeter assembly; and
    coating at least a portion of the flowmeter assembly and the at least two process connections with a diffusion coating, with the diffusion coating being diffused into and comprising a part of the flowmeter assembly, wherein the diffusion coating is applied after a welding operation of the flowmeter.

11. The method of claim 10, with the diffusion coating being diffused into the at least a portion of the flowmeter assembly above a predetermined high temperature.

12. The method of claim 10, with the diffusion coating being diffused into the at least a portion of the flowmeter assembly prior to attaching temperature-sensitive elements to the flowmeter assembly.

13. The method of claim 10, with the diffusion coating being applied by a deposition process.

14. The method of claim 10, with the diffusion coating being applied by a vapor deposition process.

15. The method of claim 10, with the diffusion coating being applied by a chemical vapor deposition process.

16. The method of claim 10, with the diffusion coating being applied to outer surfaces of the flowmeter assembly.

17. The method of claim 10, with the diffusion coating being applied to substantially fill in imperfections in the welding operation.

18. A method of forming a corrosion-resistant vibratory flowmeter, the method comprising constructing a flowmeter assembly including one or more flow tubes configured to be vibrated, with the method being characterized by:
    attaching at least two process connections to the flowmeter assembly;
    coating at least a portion of the flowmeter assembly and the at least two process connections with a diffusion coating, with the diffusion coating being diffused into and comprising a part of the flowmeter assembly, wherein the diffusion coating is applied after a welding operation of the flowmeter;
    attaching a driver and a pickoff sensor to the flowmeter assembly after coating at least a portion of the flowmeter assembly.

\* \* \* \* \*